United States Patent [19]

Kränzler et al.

[11] 4,090,098
[45] May 16, 1978

[54] ARRANGEMENT FOR ELECTRICALLY CONNECTING WIRE COILS OF AN ELECTRIC MACHINE TO AN ELECTRIC CIRCUIT

[75] Inventors: Ernst Kränzler, Stetten; Gerhard Kuhlmann, Stuttgart, both of Germany

[73] Assignee: Robert Bosch GmbH, Stuttgart, Germany

[21] Appl. No.: 731,501

[22] Filed: Oct. 12, 1976

[30] Foreign Application Priority Data

Oct. 17, 1975 Germany .............................. 2624522
Jun. 1, 1976 Germany .............................. 2546528

[51] Int. Cl.² ............................................ H02K 11/00
[52] U.S. Cl. ........................................ 310/71; 310/50; 310/91; 336/192
[58] Field of Search ...................... 310/71, 91, 47, 254, 310/50, 258, 270, 260; 336/192

[56] References Cited

U.S. PATENT DOCUMENTS

| 2,317,922 | 4/1943 | Lear ......................... 310/71 |
| 2,688,103 | 8/1954 | Sheldon .............. 310/71 UX |
| 3,151,260 | 9/1964 | MacCracken ........................... 310/71 |
| 3,502,915 | 3/1970 | Moret ..................... 310/47 |
| 3,546,556 | 12/1970 | Benkert .................... 310/50 |
| 3,604,960 | 9/1971 | Krestel .................... 310/50 |
| 3,604,964 | 9/1971 | Conard .................... 310/71 |
| 3,842,298 | 10/1974 | Schaefer .................... 310/71 |
| 3,970,881 | 7/1976 | Sato ......................... 310/71 |
| 3,974,407 | 8/1976 | Dochterman ........................... 310/71 |

FOREIGN PATENT DOCUMENTS

855,284   11/1960   United Kingdom .................... 310/71

Primary Examiner—R. Skudy
Attorney, Agent, or Firm—Michael J. Striker

[57] ABSTRACT

An electric contact arrangement for wire coils of stators of electric machines, particularly stator coils of electric motors, includes an annular support member of electrically insulating material stationarily abutting one end of the stator, pin-shaped projections on the support member extending away from the stator, and metallic contact caps pressed onto the pin-shaped projections so as to clamp portions of wires respectively located intermediate the pin-shaped projections and the contact caps. Contact members arranged in the electric circuit for supplying electric current to the coils are in an electric contact with the contact caps upon assembly of the electric machine. Recesses may be provided in the support member and particularly in the pin-shaped projections in which the wires are received, and the caps may be internally corrugated to clamp the wire between the respective corrugations and the respective recess of the pin-shaped projection. The annular support member may be of at least two parts which are connected to one another by cooperating complementary projections and grooves or pins and holes.

33 Claims, 14 Drawing Figures

ARRANGEMENT FOR ELECTRICALLY CONNECTING WIRE COILS OF AN ELECTRIC MACHINE TO AN ELECTRIC CIRCUIT

BACKGROUND OF THE INVENTION

The present invention relates to an arrangement for establishing electric contact between the electric circuit of an electric machine and the wire coils of such machines, and particularly for use in connection with stator wire coils.

Various types of electric machines, such as electric motors which can be supplied either with alternating or with direct current, are already known. Among such electric machines, there is already known an electric motor in which the ends of the winding wires of the coils are welded to separate connecting wires which, in turn, carry at their respective ends terminal lugs which are to be connected with the circuit for supplying the coils with electric current by means of screws, nuts or the like. This conventional arrangement for establishing an electric contact between the current-supplying circuit and the various coils performs to satisfaction. However, this conventional arrangement has a rather serious drawback, in that it is relatively expensive, particularly inasmuch as many of the operations which are needed for establishing such an electrical connection, especially during the mounting of the stator in the interior of a housing of the electric machine, must be performed manually. A further grave defect of this conventional arrangement is that the connecting wires can be inadvertently incorrectly connected during the assembly.

SUMMARY OF THE INVENTION

Accordingly, it is a general object of the present invention to avoid the disadvantages of the prior art.

More particularly it is an object of the present invention to provide an arrangement for establishing an electric connection between a current-supplying circuit and the stator coils of an electric machine of the type here under consideration, which is simple in construction, inexpensive, and reliable in operation.

A concomitant object of the present invention is to provide a connecting arrangement which does not lend itself to incorrect connection of the various winding wires.

In pursuance of these objects and others which will become apparent hereafter, one feature of the present invention resides, briefly stated, in an electric machine of the type having a stator including an armature and wire coils mounted thereon and an electric circuit for supplying electric current to the coils, in an arrangement for establishing electric contact between the circuit and the wires of the wire coil, comprising support means stationarily mounted at one axial end of the stator and being at least partly of an electrically insulating material; and at least partly electrically conductive contact elements rigid with the support means and extending therefrom away from the one end of the stator into contact with the circuit, said contact elements being electrically connected to the wires of the coils.

When the arrangement is constructed in the abovementioned manner, the winding wires of the various coils are directly connected with the contact elements, thus eliminating the previously existing need for separate connecting wires.

In a currently preferred embodiment of the present invention, the support means abuts the abovementioned one end of the stator, and is equipped with grooves which are adapted to receive respective portions of the wires of the coils.

It is very advantageous to so construct the contact elements that each includes a pin-shaped projection on the support means, and an electrically conductive contact cap which is adapted to be pressed onto the pinshaped projection to thereby clamp a portion of a wire of a respective coil which is located intermediate the pin-shaped projection and the contact cap. Preferably, the contact cap is of a metallic material. The contact cap also advantageously has a corrugated inner surface which comes into contact with the above-mentioned portion of a wire and clamps the same between itself and the pin-shaped projection. The pin-shaped projection, to advantage, has an elongated slot for receiving a portion of a wire of a respective coil, so that such portion of the wire is protected from undue wear.

Advantageously, the support means is of a synthetic plastic material, and the pin-shaped projections are integral portions of the support means. This greatly facilitates the manufacture of the arrangement.

Especially in the event that the stator is to be mounted in a housing of the electric machine, it is advantageous that the above-mentioned circuit include contact members which are in an electric contact with the respective contact caps pressed onto the pin-shaped projections upon assembly of the electric machine, the contact members being mounted on the housing. The contact members may then be configurated as resiliently yieldable lugs which contact the respective contact caps, or as contact sleeves which surround the respective contact caps. When the electric machine was components, such as a switch or a commutator brush holder, which are adjacent the above-mentioned one side of the stator, the contact members may be formed as part of such components.

The armature may have an axial end face at the above-mentioned one end, and the coils may have coil heads extending axially beyond the axial end face and being radially spaced therefrom; the support means may then have an additional end face which abuts the axial end face of the armature, and means for retaining the support means against rotation may be provided, including at least one recess at one of the end faces, and at least one projection at the other end face and received within the recess upon abutment of the end faces. Preferably, the coil heads engage the support means and hold the same in abutment with the axial end face of the stator in this embodiment.

The support means may include an annular member which has at least two separate arcuate parts, and means for connecting such parts with one another to form the annular member. The connecting means may include complementary grooves and projections, circumferentially or axially extending holes and pins, or the like, for engagement with one another upon assembly.

It is also proposed according to a further aspect of the present invention that the support means include a circumferentially complete annular support member which has resliently yieldable engaging portions which engage the coil heads and at least partially surround the same.

It is to further advantage when the contact elements are asymmetrically distributed on the support member, which further reduces the likelihood that the wires of the coils could be erroneously connected with improper points of the circuit for supplying the electric current to the coils. Also, this expedient is advantageous in view of the fact that the components on which the contact members are mounted are also not arranged symmetrically with respect to the axis of the electric motor.

In a further development of the basic concept of the present invention, the support member which constitutes the support means has electrically conductive portions which are respectively connected to the contact elements. An intermediate member may then be arranged between the support member and the aforementioned one end of the stator, plug-in contacts electrically connected to the electrically conductive portions and to the wires of the coils, respectively, being provided, respectively on the intermediate and the support member, and being in an electrical contact with one another upon assembly of such members with one another.

Preferably, the intermediate member may be plate-shaped, having an axial face which is juxtaposed with the end face of the armature upon assembly, and means may be provided for retaining the intermediate member against rotation relative to the stator, including at least one recess at one of the axial end faces and at least one projection at the other axial end face and received within the recess upon assembly. The plug-in contacts may include contact blades and sockets for receiving the contact blades.

The electrically conductive portions of the support member may be wires or bus bars, but they may also be formed on the support member as conductive paths, deposited either by resorting to the vapor-depositing, spray-depositing or electrolytic depositing technique or in a similar way.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DISCUSSION OF THE PREFERRED EMBODIMENTS

Figure 1:
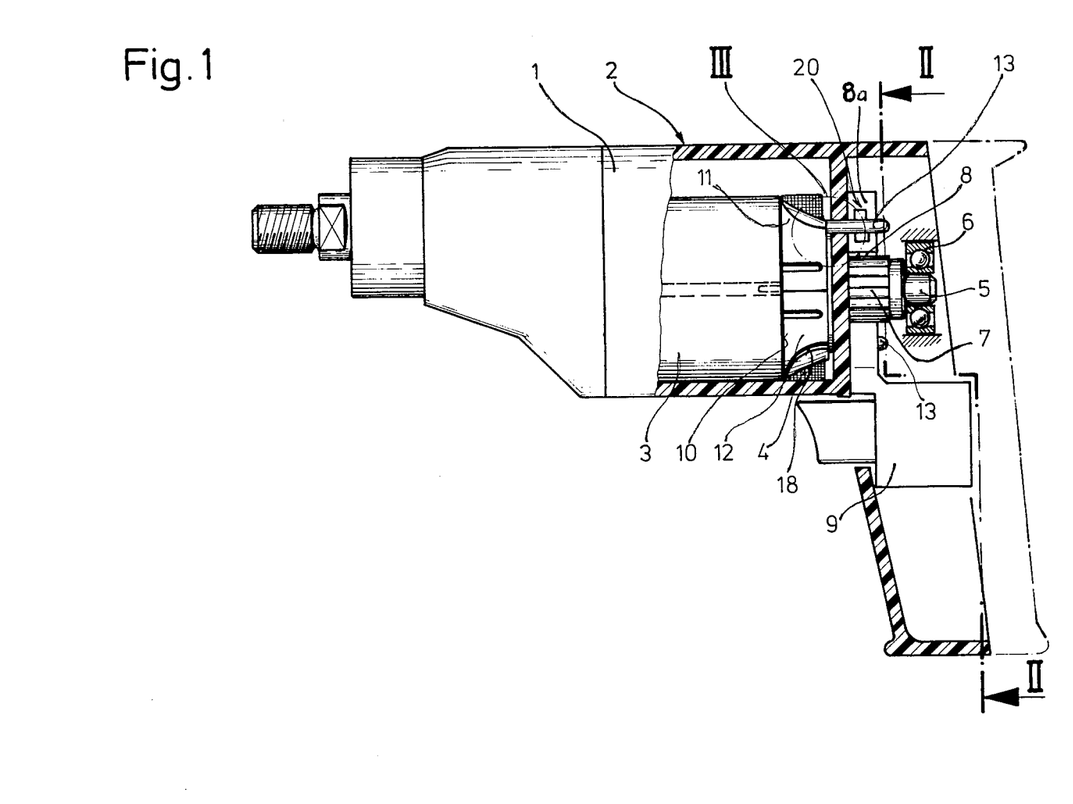
FIG. 1 is a partly sectioned side elevational view of a power tool with an electric motor constructed according to the present invention mounted therein.
Figure 2:
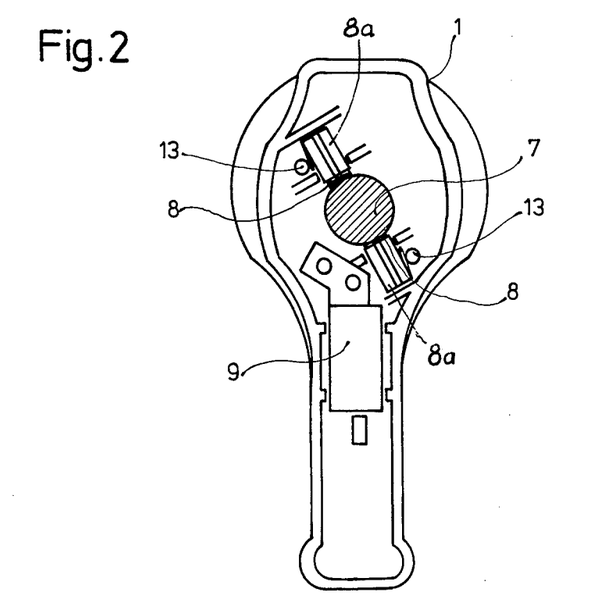
FIG. 2 is a somewhat schematic cross-sectional view taken on line II—II of FIG. 1.

Referring now to the drawing in detail, and first to FIGS. 1 and 2 thereof it may be seen that they illustrate a power tool, such as a drill, which has a housing 1 in the interior of which there is mounted an electric motor 2. The electric motor 2 has a stator 3, which may be constructed, in a conventional manner, of an armature, such as a laminated plate armature, and a plurality of wire coils mounted on the armature, of which only coil heads 4 which project beyond the armature of the stator 3 are needed for understanding the present invention and thus only such coil heads 4 have been illustrated in FIG. 1 of the drawing.

A shaft 5 is coaxially mounted in the interior of the stator 3, being mounted on anti-friction bearings, of which one ball-bearing 6 is shown in FIG. 1. A rotor is mounted on the shaft 5, which rotor is located in the interior of the stator 3 and thus is not visible in FIG. 1. Furthermore, a commutator 7, which forms a part of a conventional electric circuit for supplying electric current to the electric motor 2, is mounted on the shaft 5, and commutator brushes 8 incorporated in the electric circuit are in contact with the commutator 7 in an entirely conventional manner.

The housing 1 of the power tool has a handgrip portion, and a switch 9, which is also incorporated in the electric circuit and controls the operation of the electric motor 2, is mounted in the handgrip.

An axial end face of the armature of the stator 3 which faces the commutator 7 is designated with the reference numeral 10, and a support member consisting of two interconnected arcuate or semi-annular parts 11, 12 is arranged at the axial end face 10 of the stator 3. The outer contour, as considered in the radial direction, of the semi-annular parts 11, 12 in their interconnected assembled position substantially corresponds to the outer contour of the armature of the stator 323 considered in the same direction. The parts 11, 12 are made at least in part but preferably in their entirety of an electrically insulating material, such as a synthetic plastic material having the desired electrically insulating and other properties. Such materials are well known in the art.

Figure 3:
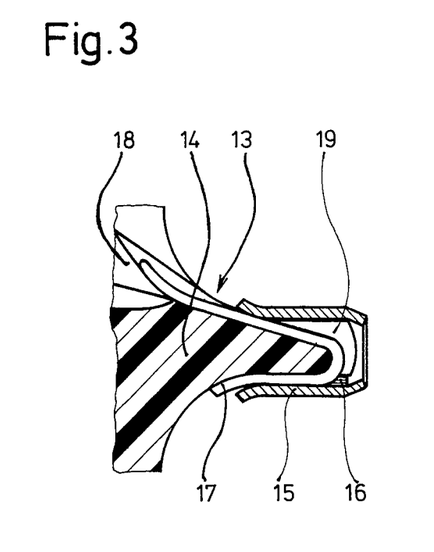
FIG. 3 illustrates a detail III of FIG. 1 at an enlarged scale.
Figure 4:
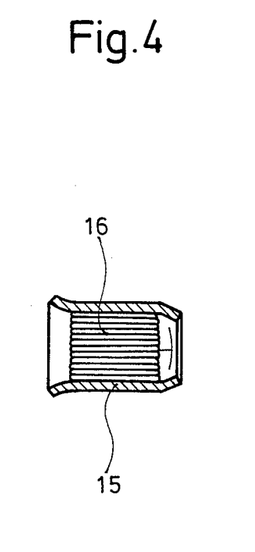
FIG. 4 is a sectional view of a contact cap used in the arrangement of FIG. 1.

The semi-annular parts 11, 12 are provided, at their surfaces which face away from the stator 3 in the assembled position, with axially extending contact elements 13. Each contact element 13 includes a pin-shaped projection 14 rigid with the support member, that is, one of the semiannular parts 11, 12, and of an electrically conductive contact cap 15. Preferably, the pin-shaped projection 14 is integrally formed with the respective semi-annular part 11 or 12. The contact cap 15 is preferably made in its entirety of an electrically conductive metallic material, and is formed at its inner surface with corrugations 16. In the assembled position, the contact cap 15 is pressed onto the respective pin-shaped projection 14. A portion 17 of a winding wire of a respective coil, preferably an end portion, is confined between the outer circumferential surface of the pin-shaped projection 14 and the corrugated inner surface 16 of the contact cap 15, and clamped therebetween by pressing the contact cap 15 onto the pin-shaped projection 14.

In order to protect the portion 17 of the wire of the respective coil from damage, such portion 17 is accommodated in a groove 18 of the respective semiannular part 11, 12, and in an elongated slot 19 provided in the pin-shaped projection 14. When the contact cap 15 is pressed onto the pin-shaped projection 14, the corrugations 16 provided at the inner surface of the contact cap 15 remove or penetrate the insulating lacquer provided in a layer on the outer surface of the portion 17 of the winding wire, so as to establish an electric contact between the portion 17 of the wire, and the contact cap 15.

Figure 5:
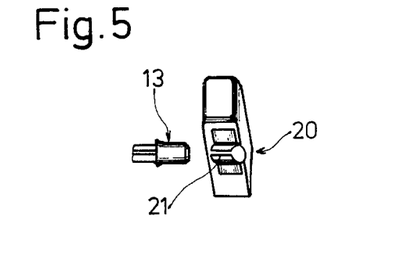
FIG. 5 shows the cooperation of the contact cap with a contact member of a sleeve-shaped configuration.

Each of the axially extending contact elements 13 cooperates with associated contact members 20 which are mounted on stationary components of the housing 1 which accommodates the electric motor 2. As particularly illustrated in FIG. 5, the contact members 20 may be configured with sleeves 21 which, in their assembled condition, circumferentially surround and contact the respective contact element 13, and particularly the contact cap 15 thereof. Each of the contact members 20 may be formed as an integral part of a casing of an electric component of the electric circuit mounted in the housing 1 and located adjacent but spaced from the end face 10 of the stator 3, such as the casing of the switch 9 or holders 82 for the commutator brushes 8.

Figures 7, 8, 9, 10, 11:
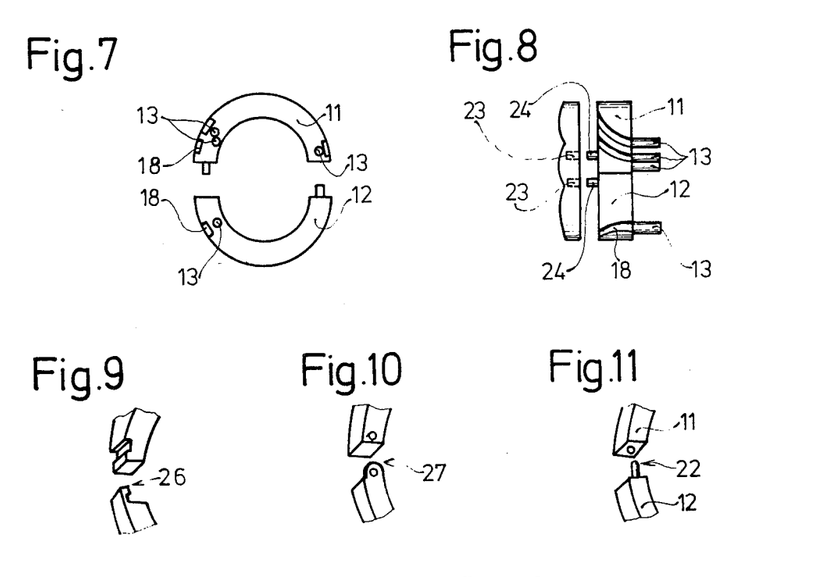
FIG. 7 is an axial end view of a support ring having a pair of arcuate parts, in a disassembled condition.
FIG. 8 is a side elevational view of the support member of FIG. 7, in an assembled condition and juxtaposed with the stator of the electric machine.
FIGS. 9, 10 and 11 illustrate, respectively, three exemplary embodiments of a connection between the two arcuate parts illustrated in FIGS. 7 and 8.

The semi-annular parts 11, 12 of the support member, which can be interconnected with one another by means of, for instance, a circumferentially extending hole-and-pin connection illustrated in FIG. 11, are retained against rotation relative to the stator 3, in a manner illustrated in FIG. 8, by means of pins 24 which project from a support end face of the support member and are received in associated openings 23 provided at the axial end face 10 of the armature of the stator 3 upon assembly. As illustrated in FIG. 1, the semi-annular parts 11, 12 of the support member are introduced into the space adjacent to the end face 10 and radially bounded by the coil heads 4 of the coils mounted on the armature of the stator 3 until an axial support end face of the support member abuts the end face 10, and will be held against displacement relative to the axial end face 10 of the armature of the stator 3 by such coil heads 4, without any need for auxiliary holding means.

In this manner, the portions 17 of the winding wire are securely received and held in an insulating support member of a synthetic plastic material having the desired electrically insulating and other properties. The assembly of, and the concomitant establishing of the electric contact by, the contact elements 13 is accomplished, as described before, in a very simple manner. The same is true about the cooperation of the contact elements with the associated contact members 20. This is accomplished by simply introducing the contact cap 15, pressed onto the pin-shaped projection 14, into the respective sleeve 21 in the embodiment illustrated in FIG. 5.

Figure 6:
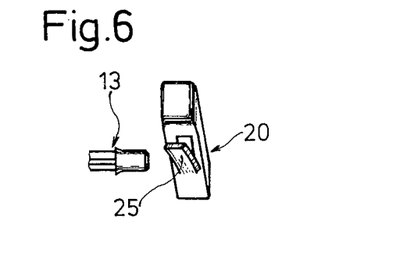
FIG. 6 is a view similar to FIG. 5 but with the contact member being configurated as a resiliently yieldable lug.

Of course, instead of being mounted on the components of the housing 1, the sleeves 21 or similar contact members may be connected to electric wires of the circuit for supplying the electric current to the coils of the motor 2. However, when the electric contact is established directly by means of the contact members 20, the need existing in the prior art for arranging wires in the housing 1 is eliminated. Thus, the assembly of the various components is accomplished without running into any problems. Also, the previously present danger of erroneously connecting the various wires with one another is avoided. In addition thereto, the various components can be pre-assembled to form a structural unit to be introduced into the housing 1, which preassembly can be accomplished either manually, or by using automated processes. The removal of the entire stator 3 from the housing 1 for testing or repair purposes is considerably simplified by constructing the arrangement for establishing the electric contact according to the present invention. Evidently, the contact members 20 can also be constructed in a different way, so long as they are capable of establishing the electric contact with the contact element 13. One such possibility is illustrated in FIG. 6 where the contact member 20, which can again be integral with one of the components of the housing 1, such as the switch 9 or the holder 82 for the brushes 8, has a resiliently yieldable contact lug 25 which contacts the contact cap 15 of the respective contact element 13.

Also, instead of the connection 22 of FIG. 11, the semi-annular parts 11 and 12 can be connected with one another in any other way, such as by means of a connection 26 illustrated in FIG. 9 in which one of the parts 11, 12 is formed, at one of its ends, with a groove into which a projection formed at the associated end of the other part 12, 11 is received with snap action or into which the projection is introduced in the axial direction. Also, the connection 27 illustrated in FIG. 10, can be used, consisting of an axially extending pin on one end of one of the parts 11, 12, which is received in an axially extending hole formed in a lug provided at the associated end of the other part 12, 11.

Figure 12:
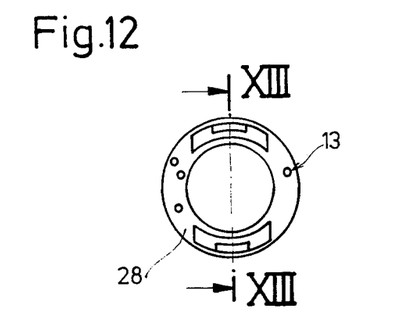
FIG. 12 is an axial end view of a unitary annular support member.
Figure 13:
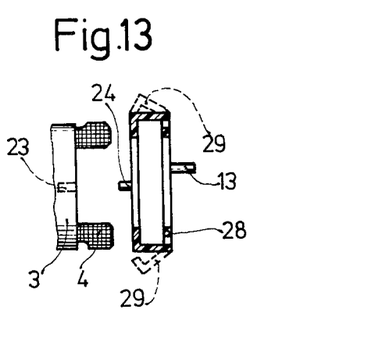
FIG. 13 is a sectional view of the support member taken on line XIII—XIII of FIG. 12 in juxtaposition with the stator of the electric machine.

Finally, the support member which has been illustrated and described as consisting of at least two parts 11, 12 can be replaced by a one-piece annular support member 28 illustrated in FIGS. 12 and 13, which support member 28 has clamping projections 29 extending substantially in the axial direction, which projections 29 are deflectable and circumferentially surround and engage the coil heads 4 in the assembled position.

Figure 14:
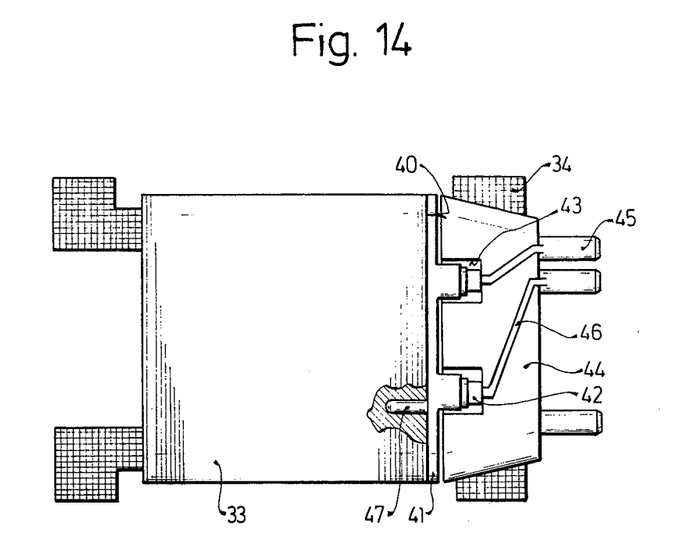
FIG. 14 is a partly sectioned side elevational view of a further embodiment of the present invention which can be used in the device of FIG. 1.

FIG. 14 illustrates a modified embodiment of the present invention in which the stator is designated with the reference numeral 33, including coils of which again only the coil heads 34 have been illustrated. The stator 33 further has an armature which has an axial end face 40, at which there is arranged an intermediate member 41 of a plate-shaped configuration. The intermediate member 41 is retained against rotation relative to the stator 33 by means of at least one pin-shaped projection 47 which is received in a complementary bore provided in the armature of the stator 33.

The intermediate plate-shaped member 41 carries at its side which faces away from the armature of the stator 33 a plurality of electric contacts 42, preferably contact blades each of which is connected with a corresponding portion 17 of the winding wire of the respective coil, for instance, in the same manner as discussed previously in connection with FIG. 3.

The contact blades 42 are received within cooperating sockets 43 of a support member 44 which, in all other respects, is similar to the support member 11, 12 or 28 which have been described previously. Preferably, the support member 44 is of an annular configuration and is of one-piece, but its construction of several interconnected parts is also contemplated. Similarly to what has been indicated above, the support member 44 may be at least partly of an electrically insulating material, such as of an appropriate synthetic plastic material.

The support member 44 is provided at its axial end which faces away from the intermediate member 41 with contact elements 45 which structurally and functionally correspond to the contact elements 13 of the previously discussed embodiment. The contact elements 45 constitute a centralized plug-in connection with the cooperating contact members which have not been shown in FIG. 14, such a plug-in connection rendering it possible to establish all the needed electric contacts in one operation. Preferably, the contact elements 45 are asymmetrically distributed on the support member 44, or on the support members 11, 12 or 28 as the case may be, so that the various coils can be brought into the electric circuit for supplying electric current to the various coils at appropriate points of the circuit, without any possibility of inadvertent error.

Electrically conductive paths 46 electrically interconnect the sockets 43 for the contact blades 42 with the contact elements 45. The electrically conductive paths 46 can be constituted by wires, bus bars, or vapor-deposited, spray-deposited or electrolytically-deposited metallic conductive paths.

It will be understood that each of the elements described above, or two or more together, may also find a useful application in other types of constructions differing from the types described above.

While the invention has been illustrated and described as embodied in an arrangement for establishing electric contact between the winding wires of stator coils of electric machines and the electric circuit for supplying electric current to such coils, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features, that from the standpoint of prior art, fairly constitute essential characteristics of the generic or specific aspects of this invention.

What is claimed as new and desired to be protected by Letters Patent is set forth in the appended claims:

1. In an electric machine of the type having a stator including an armature and wire coils mounted thereon, and an electric circuit for supplying electric current to the wire coils, an arrangement for establishing electric contact between the circuit and the wires of the wire coil, comprising support means stationarily mounted at one axial end of the stator and being at least partly of an electrically insulating material; and at least partly electrically conductive contact elements rigid with said support means and extending therefrom away from said one end of the stator into contact with the circuit, each of said contact elements including a pin-shaped projection on said support means having an elongated slot for receiving a portion of a respective wire of a respective wire coil, and an electrically conductive contact cap adapted to be pressed onto said pin-shaped projection to thereby clamp said portion of the respective wire which is located intermediate said pin-shaped projection and said contact cap, and received in said slot and electrically connect the respective contact element to the respective wire.

2. An arrangement as defined in claim 1, wherein said support means abuts said one end of the stator.

3. An arrangement as defined in claim 1, wherein said support means has grooves adapted to receive respective portions of the wires of the coils.

4. An arrangement as defined in claim 1, wherein said contact cap is of a metallic material.

5. An arrangement as defined in claim 1, wherein said contact cap has a corrugated inner surface.

6. An arrangement as defined in claim 1, wherein the circuit includes contact members each in electric contact with the respective contact cap supported on said pin-shaped projection of the electric machine.

7. An arrangement as defined in claim 6, wherein the electric machine has a housing in which the stator is mounted; and wherein said contact members are mounted on the housing.

8. An arrangement as defined in claim 6, wherein said contact members have contact sleeves surrounding the respective contact caps.

9. An arrangement as defined in claim 6, wherein the electric machine has components which are adjacent said one side of the stator, and wherein said contact members are configured as parts of said components.

10. An arrangement as defined in claim 9, wherein one of such components is a switch.

11. An arrangement as defined in claim 9, wherein one of such components is a commutator brush holder.

12. An arrangement as defined in claim 1, wherein the armature has an axial armature end face at said one end and the coils have coil heads extending axially beyond said axial end face and being radially spaced therefrom; and wherein said support means has support end face which abuts said axial end face of said armature.

13. An arrangement as defined in claim 12, and further comprising means for retaining said support means against rotation relative to the stator, including at least one recess at one of said end faces, and at least one projection at the other end face and received within said recess upon abutment of said end faces.

14. An arrangement as defined in claim 12, wherein said coil heads engage said support means and hold the same in abutment with the axial end face of the stator.

15. An arrangement as defined in claim 12, wherein said support means includes an annular member having at least two separate arcuate parts, and means for connecting said parts with one another to form said annular member.

16. An arrangement as defined in claim 1, wherein the armature has an axial end face at said one end and the coils have coil heads extending axially beyond said axial end face and being radially spaced therefrom; and wherein said support means includes a circumferentially complete annular support member having resiliently yieldable engaging portions which engage said coil heads and at least partially surround the same.

17. An arrangement as defined in claim 1, wherein said contact elements are asymmetrically distributed on said support means.

18. In an electric machine of the type having a stator including an armature and wire coils mounted thereon, and an electric circuit for supplying electric current to the wire coils, an arrangement for establishing electric contact between the circuit and the wires of the wire coil, comprising support means stationarily mounted at one axial end of the stator and being at least partly of an electrically insulating synthetic plastic material; and at least partly electrically conductive contact elements rigid with said support means and extending therefrom away from said one end of the stator into contact with the circuit, each of said contact elements including a pin-shaped integral projection of said support means, and an electrically conductive contact cap adapted to be pressed onto said pin-shaped projection to thereby clamp a portion of a wire of a respective wire coil which is located intermediate said pin-shaped projection and said contact cap.

19. In an electric machine of the type having a stator including an armature and wire coils mounted thereon, and an electric circuit for supplying electric current to the wire coils, an arrangement for establishing electric contact between the circuit and the wires of the wire coil, comprising support means stationarily mounted at one axial end of the stator and being at least partly of an electrically insulating material; at least partly electrically conductive contact elements rigid with said support means and extending therefrom away from said one end of the stator into contact with the circuit, each of said contact elements including a pin-shaped projection on said support means, and an electrically conductive contact cap adapted to be pressed onto said pin-shaped projection to thereby clamp a portion of a wire of a respective wire coil which is located intermediate said pin-shaped projection and said contact cap; and contact members in the electric circuit, including resiliently yieldable lugs contacting the respective contact caps supported on the respective pin-shaped projections of the electric machine to establish an electric connection therewith.

20. In an electric machine of the type having a stator including an armature having an axial end face at one axial end thereof, and wire coils mounted on the armature and having coil heads extending axially beyond the one axial end face and being radially spaced therefrom, and an electric circuit for supplying electric current to the wire coils, an arrangement for establishing electric contact between the circuit and the wires of the wire coil, comprising support means at least partly of an electrically insulating material, having a support end face and including an annular member having at least two separate arcuate parts and means for connecting said parts with one another to form said annular member including complementary grooves, and projections engaging into said grooves, on said parts, said support means being so stationarily mounted at the one axial end of the stator that said support end face abuts said axial end face of said armature; and at least partly electrically conductive contact elements rigid with said support means and extending therefrom away from said one end of the stator into contact with the circuit, said contact elements being electrically connected to the wires of said coils.

21. In an electric machine of the type having a stator including an armature having an axial end face at one axial end thereof, and wire coils mounted on the armature and having coil heads extending axially beyond the one axial end face and being radially spaced therefrom, and an electric circuit for supplying electric current to the wire coils, an arrangement for establishing electric contact between the circuit and the wires of the wire coil, comprising support means at least partly of an electrically insulating material having a support end face and including an annular member having at least two separate arcuate parts and means for connecting said parts with one another to form said annular member including complementary holes, and pins received in said holes, on said parts and extending circumferentially of said annular member, said support means being so stationarily mounted at the one axial end of the stator that said support end face abuts said axial end face of said armature; and at least partly electrically conductive contact elements rigid with said support means and extending therefrom away from said one end of the stator into contact with the circuit, said contact elements being electrically connected to the wires of said coils.

22. In an electric machine of the type having a stator including an armature having an axial end face at one axial end thereof, and wire coils mounted on the armature and having coil heads extending axially beyond the one axial end face and being radially spaced therefrom, and an electric circuit for supplying electric current to the wire coils, an arrangement for establishing electric contact between the circuit and the wires of the wire coil, comprising support means at least partly of an electrically insulating material, having a support end face and including an annular member having at least two separate arcuate parts and means for connecting said parts with one another to form said annular member including complementary holes, and pins received in said holes, on said parts and extending axially of said annular member, said support means being so stationarily mounted at the one axial end of the stator that said support end face abuts said axial end face of said armature; and at least partly electrically conductive contact elements rigid with said support means and extending therefrom away from said one end of the stator into contact with the circuit, said contact elements being electrically connected to the wires of said coils.

23. In an electric machine of the type having a stator including an armature and wire coils mounted thereon, and an electric circuit for supplying electric current to the wire coils, an arrangement for establishing electric contact between the circuit and the wires of the wire coil, comprising support means stationarily mounted at one axial end of the stator and including an annular support member at least partly of an electrically insulating material and having electrically conductive portions; an intermediate member between said support member and said one end of the stator; and at least partly electrically conductive contact elements rigid with said support means, extending therefrom away from said one end of the stator into contact with the circuit and electrically connected to said electrically conductive portions, said members having respective plug-in contacts electrically connected to said electrically conductive portions and the wires of the coils, respectively, and in respective electric contact with one another.

24. An arrangement as defined in claim 23, wherein each of said contact elements includes a pin-shaped projection on said support means, and an electrically conductive contact cap adapted to be pressed onto said pin-shaped projection to thereby clamp a portion of a wire of a respective coil which is located intermediate said pin-shaped projection and said contact cap.

25. An arrangement as defined in claim 24, wherein said pin-shaped projection has an elongated slot for receiving a portion of a wire of a respective coil.

26. An arrangement as defined in claim 23, wherein said intermediate member is plate-shaped.

27. An arrangement as defined in claim 23, wherein said plug-in contacts include contact blades, and sockets for said contact blades.

28. An arrangement as defined in claim 23, wherein the armature has an axial end face and said intermediate member has an additional axial end face juxtaposed with said axial end face of the armature; and further comprising means for retaining said intermediate member against rotation relative to the stator, including at least one recess at one of said axial end faces, and at least one projection at the other axial end face and received within said recess.

29. An arrangement as defined in claim 23, wherein said electrically conductive portions of said support member are wires.

30. An arrangement as defined in claim 23, wherein said electrically conductive portions of said support member are bus bars.

31. An arrangement as defined in claim 23, wherein said electrically conductive portions of said support member are vapor-deposited paths.

32. An arrangement as defined in claim 23, wherein said electrically conductive portions of said support member are spray-deposited paths.

33. An arrangement as defined in claim 23, wherein said electrically conductive portions of said support member are electrolytically deposited paths.

* * * * *